No. 776,557. PATENTED DEC. 6, 1904.
C. G. SIMONDS.
ELECTRIC TRANSMISSION MECHANISM.
APPLICATION FILED MAY 5, 1904.
NO MODEL. 2 SHEETS—SHEET 2.

WITNESSES:
INVENTOR:
Charles G. Simonds.
by Albert G. Davis
Att'y.

No. 776,557.

Patented December 6, 1904.

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

ELECTRIC TRANSMISSION MECHANISM.

SPECIFICATION forming part of Letters Patent No. 776,557, dated December 6, 1904.

Application filed May 5, 1904. Serial No. 206,494. (No model.)

*To all whom it may concern:*

Be it known that I, CHARLES G. SIMONDS, a citizen of the United States, residing at Schenectady, in the county of Schenectady and State of New York, have invented certain new and useful Improvements in Electric Transmission Mechanisms, of which the following is a specification.

My invention relates to electric transmission mechanisms, and is particularly applicable to transmission mechanisms for automobiles and similar drives in which it is essential that the mechanism should be compact, self-contained, and practically dust-proof.

It has been proposed heretofore to transmit the power from a prime mover to the load with variable relations of speed and torque by means of an electric generator having both parts movable, one driven by the prime mover and the other connected to the load. The relative slip of the two members of the generator can be adjusted by varying the field strength of the generator, and in this manner the load speed may be regulated. Moreover, the energy generated by the relative movement of the two members of the generator may be utilized in a second dynamo-electric machine arranged to convert this energy into mechanical power and to apply it in driving the load. Such a transmission mechanism involves certain mechanical difficulties, since both members of the generator must be made rotatable. In the case of an automobile-drive, where the mechanism is subject to hard usage, where the available space is limited, and where all parts are continually attacked by dust, the difficulties of mechanical construction are increased.

The object of my invention is to provide a strong, compact, self-contained, and practically dust-proof construction for such a transmission mechanism as has been described above.

My invention will best be understood by reference to the accompanying drawings, in which—

Figure 1:
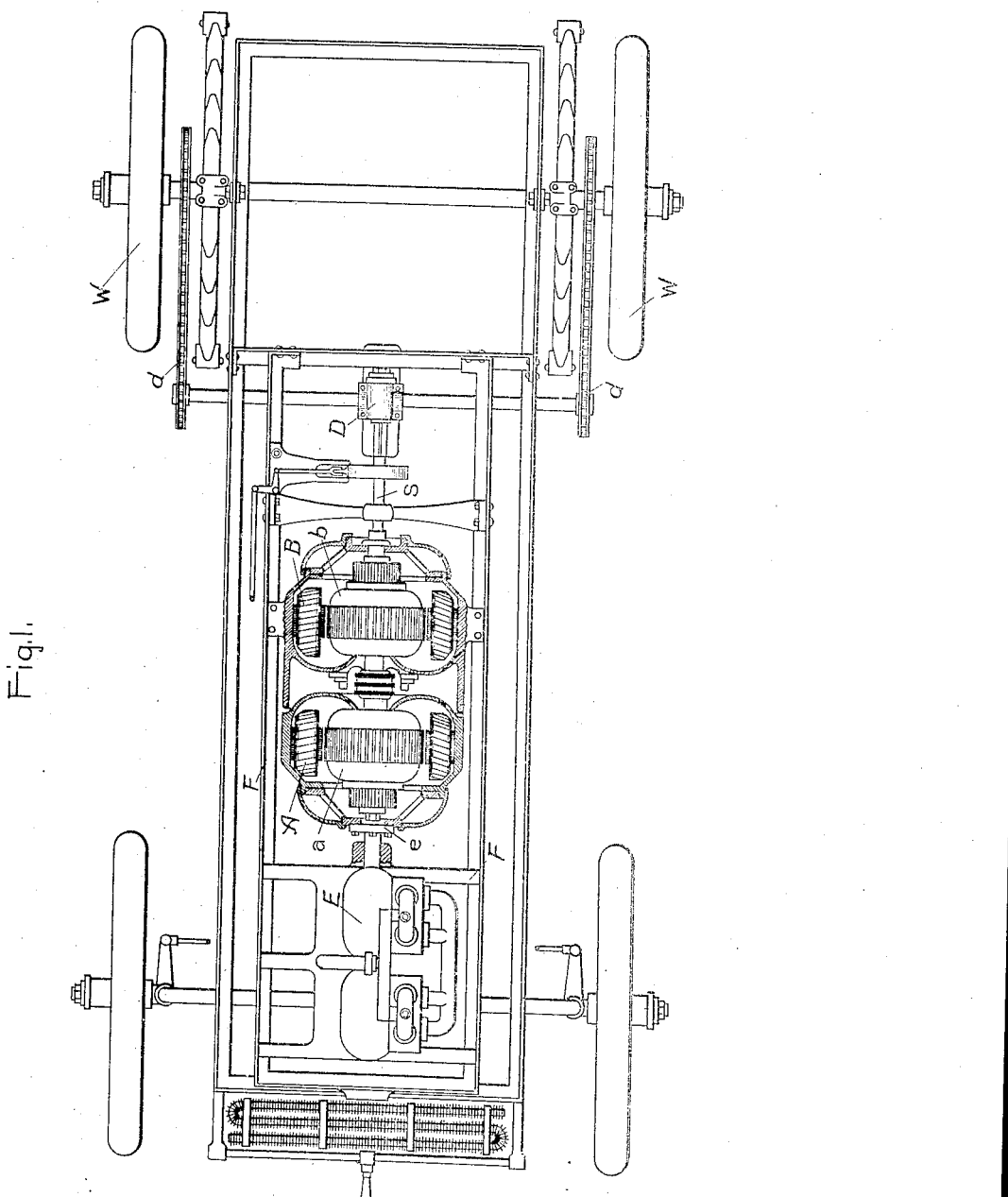
Figure 2:
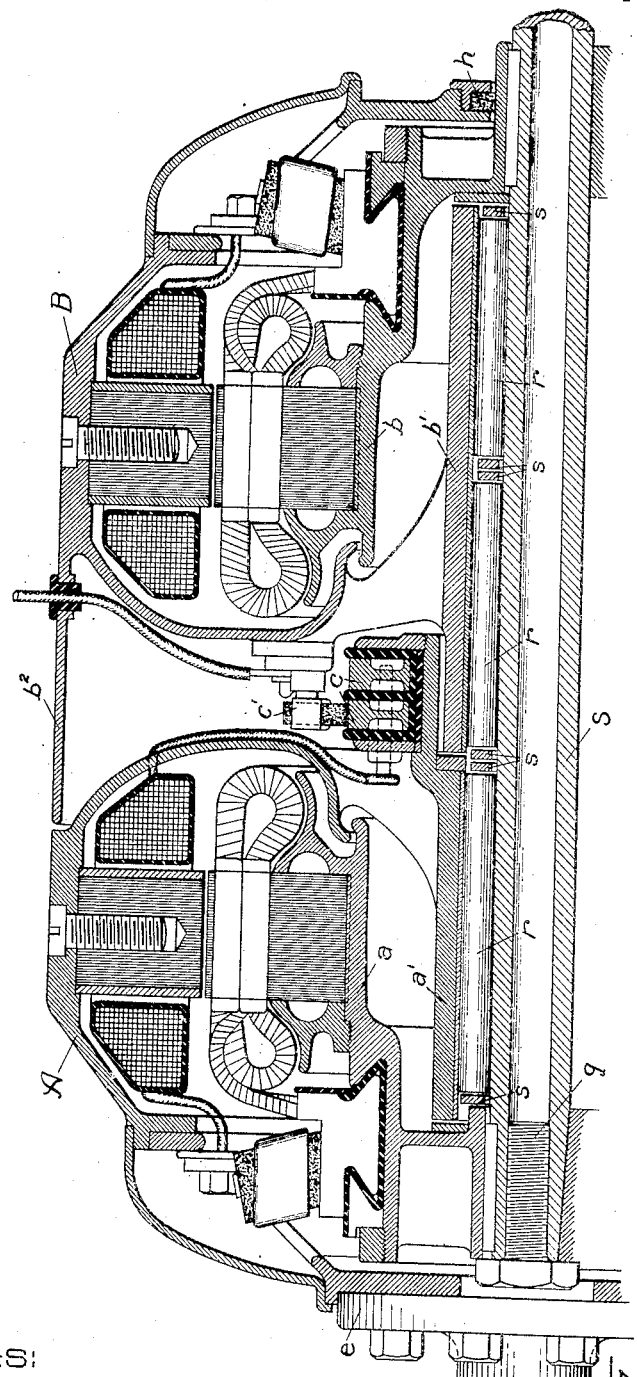

Figure 1 shows a transmission mechanism arranged in accordance with my invention applied to an automobile, and Fig. 2 shows an enlarged cross-sectional view of the mechanism.

In Fig. 1, E represents a prime mover, such as a gas-engine supported from the frame F. The shaft of engine E carries the flange $e$, to which is bolted the field A of an electric generator. The armature $a$ of the generator is mounted on the shaft S, which drives the differential gear D, which is connected, through the sprocket-chains $d$, to the driving-wheels W of the vehicle. B represents the field of a second dynamo-electric machine, which is supported on the frame F. The armature $b$ of this machine is also mounted on shaft S.

Referring now more particularly to Fig. 2, it will be seen that the field A, which is bolted to the engine-flange $e$, is extended on its inner side by a web, so as nearly to encircle the armature $a$. The end of this web forms a bearing $a'$ for the driven shaft S, the rollers $r$ being inserted between the bearing $a'$ and the shaft S. The armature $a$ is keyed to the end of shaft S, as shown, and overhung to bring it within the field. The shaft S is tapered at its end, and armature $a$ is keyed to the tapered end and held in position by means of the bolt $g$. The rotatable field A carries the collector-rings $c$, by means of which current may be supplied to the field-coils. The brushes $c'$ are supported from the stationary field B of the second machine. This stationary field B also has an extended web practically encircling the armature $b$, and the end of which forms a bearing $b'$ for the shaft S. $s$ $s$ are spacing-rings for separating the rollers $r$ $r$. The armature $b$ is also keyed to shaft S and is overhung similarly to armature $a$. Stationary field B is provided with a flange $b^2$, extending into close proximity to the revolving field A and serving to exclude dust from the collector-rings and bearing. Field B is also provided with a dust-ring $h$, surrounding shaft S. It will be seen by this arrangement that a practically continuous bearing for shaft S is secured through the entire transmission mechanism, rigidity of construction obtained, and maintenance of perfect alinement insured.

Furthermore, the structure is practically self-contained, requiring outside support only for the stationary field B.

It will be obvious that many of the structural details which I have shown may be altered without departing from the spirit of my invention, and I aim in the appended claims to cover all such modifications which come within the spirit and scope of my invention.

What I claim as new, and desire to secure by Letters Patent of the United States, is—

1. In combination, two relatively movable shafts in line with each other, and a dynamo-electric machine having its field carried at the extremity of one shaft and its armature carried at the extremity of the second shaft, said field having a web extending around said armature and forming a bearing for said second shaft.

2. In combination, two relatively movable shafts in line with each other, and a dynamo-electric machine having its field carried at the extremity of one shaft and its armature carried at the extremity of the second shaft and overhung in a direction away from said extremity, said field having a web extending around and within the body of said armature and forming a bearing for said second shaft.

3. In combination, two relatively movable shafts in line with each other, a dynamo-electric machine having its field carried at the extremity of one shaft and its armature carried at the extremity of the second shaft, said field having a web extending around said armature and forming a bearing for said second shaft, and a second dynamo-electric machine having its armature carried by said second shaft and its field stationary, said field having a web extending around its armature and forming a bearing for said second shaft adjacent to the first bearing.

4. In combination, two relatively movable shafts in line with each other, a dynamo-electric machine having its field carried at the extremity of one shaft and its armature carried at the end of the second shaft and overhung in a direction away from its extremity, said field having a web extending around and within the body of said armature and forming a bearing for said second shaft, and a second dynamo-electric machine having its field stationary, its armature carried by said second shaft and overhung toward the first armature, said second field having a web extending around and within the body of said second armature and forming a bearing for said shaft adjacent to the first bearing.

5. In combination, a shaft, and two dynamo-electric machines having their armatures mounted thereon and overhung toward each other, the fields of both machines having webs extending around and within the bodies of said armatures and forming adjacent bearings for said shaft between said armatures.

6. In combination, a shaft, and two dynamo-electric machines having their armatures mounted thereon, the fields of said machines being movable relatively to each other and to the shaft and each field having a web extending around its armature and forming a bearing for said shaft between said armatures.

7. In combination, a shaft, and dynamo-electric machines having their armatures mounted thereon, the fields of said machines being movable relatively to each other and to the shaft, each field having a web extending around its armature and forming a bearing for said shaft between said armatures, and one of said fields having a second web extending into close proximity to the exterior of the other field so as to form a practically continuous casing for said machines.

In witness whereof I have hereunto set my hand this 3d day of May, 1904.

CHARLES G. SIMONDS.

Witnesses:
BENJAMIN B. HULL,
HELEN ORFORD.